United States Patent
Huang

(10) Patent No.: US 7,287,888 B2
(45) Date of Patent: Oct. 30, 2007

(54) ADJUSTING DEVICE FOR AUTOMOBILE HEADLAMP PROJECTION ANGLE

(76) Inventor: Hsian-Yi Huang, P.O. Box 90, Tainan City 70499 (TW)

( * ) Notice: Subject to any disclaimer, the term of this patent is extended or adjusted under 35 U.S.C. 154(b) by 182 days.

(21) Appl. No.: 11/246,052

(22) Filed: Oct. 11, 2005

(65) Prior Publication Data

US 2007/0097697 A1   May 3, 2007

(51) Int. Cl.
*F21V 19/02* (2006.01)
*F21V 21/14* (2006.01)

(52) U.S. Cl. .................. 362/524; 362/515; 362/528; 362/529

(58) Field of Classification Search ............... 362/423, 362/515, 524, 528, 529
See application file for complete search history.

(56) References Cited

U.S. PATENT DOCUMENTS 5,309,780 A * 5/1994 Schmitt .................. 74/89.13
6,543,924 B2 * 4/2003 Sugimoto et al. ........... 362/523
7,036,964 B2 * 5/2006 Takii et al. ................. 362/465

* cited by examiner

*Primary Examiner*—Sandra O'Shea
*Assistant Examiner*—Jason Moon Han

(57) ABSTRACT

An adjusting device for automobile headlamp projection angle comprises a case, a bearing ring, a connection beam, a magnet, a main axle, a pair of forward-wound coil and backward-wound coil, a pair of active transmission gear wheel and passive transmission gear wheel, and a circuit board. The circuit board controls the charging of the coils, determining the poiarity of the magnet, whereby the transmission gear wheels will move and drive an up or down shift of the main axle. A stopping piece mounted on the passive transmission gear wheel will move and confine the movement of the main axle between an upper and a lower limits, which limits are controlled by a handle on the circuit board. Therefore, over-extension and over-contraction of the main axle can be prevented. Further, the transmission will be more sensitive, and the total volume of the device will be small.

3 Claims, 7 Drawing Sheets

US 7,287,888 B2

ADJUSTING DEVICE FOR AUTOMOBILE HEADLAMP PROJECTION ANGLE

FIELD OF THE INVENTION

The present invention relates to adjusting devices for automobile headlamp projection angle, more particularly to an adjusting device for automobile headlamp projection angle wherein a circuit board inhibits in a case of the device will charge a pair of coils and control the polarity of a magnet, whereby a pair of transmission gear wheels will move accordingly and drive an up or down shift of a main axle. Further, a stopping piece mounted on a passive transmission gear wheel will move accordingly and confine the movement of the main axle between an upper and a lower limits, which limits are controlled by a handle on the circuit board. Therefore, over-extension and over-contraction of the main axle can be prevented. Further, the transmission will be more sensitive, and the total volume of the device will be small.

BACKGROUND OF THE INVENTION

The projection angle of the conventional automobile headlamp is fixed, therefore being not able to accommodate cars of various heights. Accordingly, some cars are equipped with additional angle adjusting devices, which are shown in FIGS. 1 and 2. The device comprise a bolt 11 attached to a headlamp and connected to the axial hole 121 of a sleeve 12. The free end of the sleeve 12 is provided with a polygonal projection 122 capable of being connected to a teethed ring 131 around a round disk 13. The device further comprises an adjusting bolt 14 vertically crossing the bolt 11 with a gear wheel 15 thereon. The gear wheel 15 is engaged with the round disk 13. The device further includes a fixed mount 16 and a retaining mount 17, respectively housing the bolt 11 and the adjusting bolt 14. Thereby, as the adjusting bolt 14 is twisted, the bolt 11 will move accordingly through the transmission of the gear wheel 15, the round disk 13 and the sleeve 12, by which the projection angle of the headlamp can be adjusted. However, the conventional angle adjusting device needs an extra transmission unit, whereby the adjusting bolt 14 can be moved, and which will take extra space. Meanwhile, there is not a retaining mechanism for restricting the range of shift of the bolt 11, which may lead to problems of over-extension and over-contraction. Therefore, an additional restricting mechanism is needed, which will occupy an extra space. To sum up, the transmission and position-restricting units together will make the conventional angle adjusting device too large.

SUMMARY OF THE INVENTION

The primary objective of the present invention is to provide an adjusting device for automobile headlamp projection angle having an extra function of restricting the shift of a bolt for preventing over-contraction or over-extension and for more sensitive transmission. At the same time, the volume of the device is small, and therefore it is easy to install by a headlamp.

DETAILED DESCRIPTION OF THE INVENTION

The various objects and advantages of the present invention will be more readily understood from the following detailed description when read in conjunction with the appended drawings.

Figure 1:
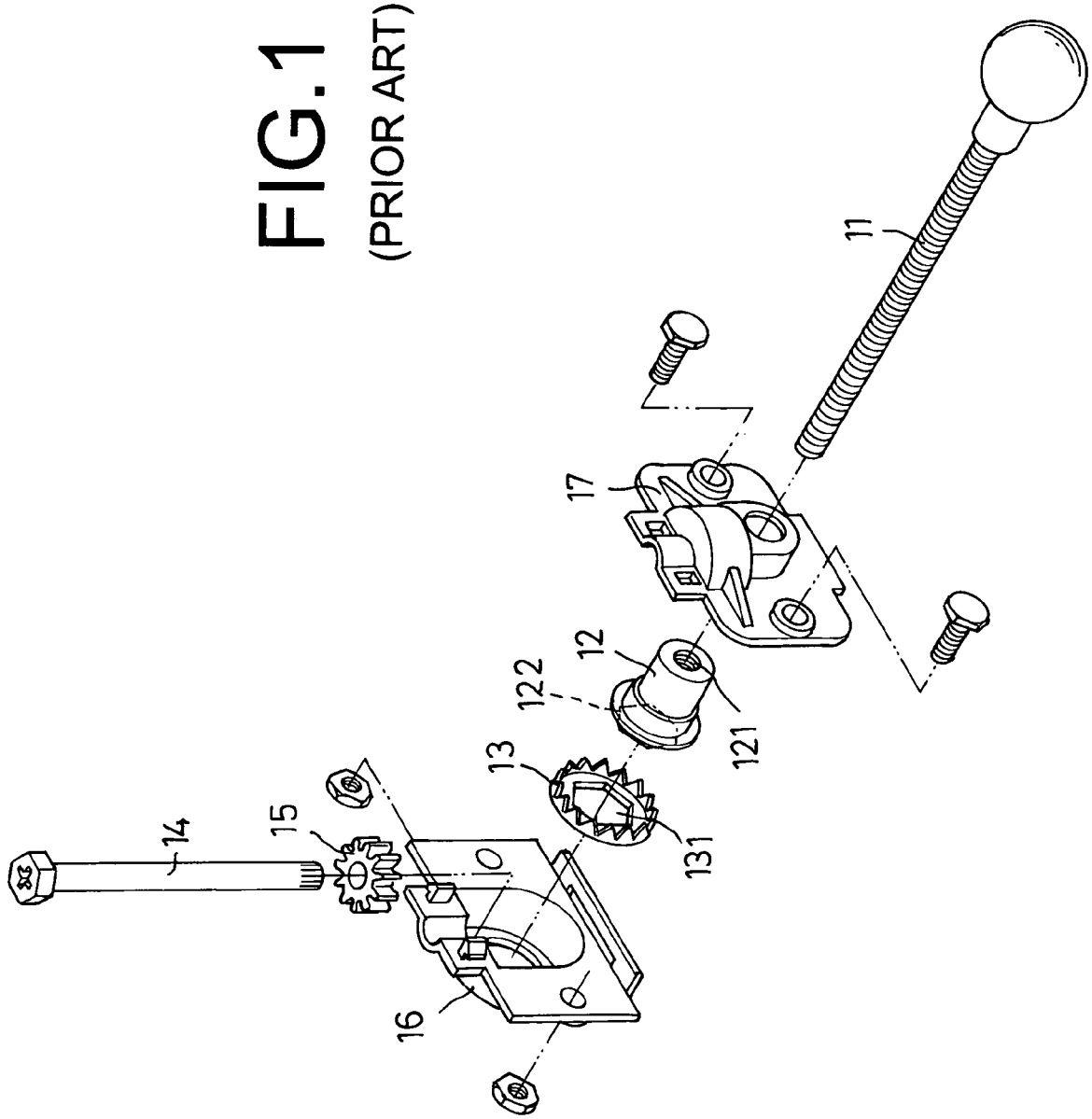
FIG. 1 is an exploded perspective view of an adjusting device for automobile headlamp projection angle of the prior art.
Figure 2:
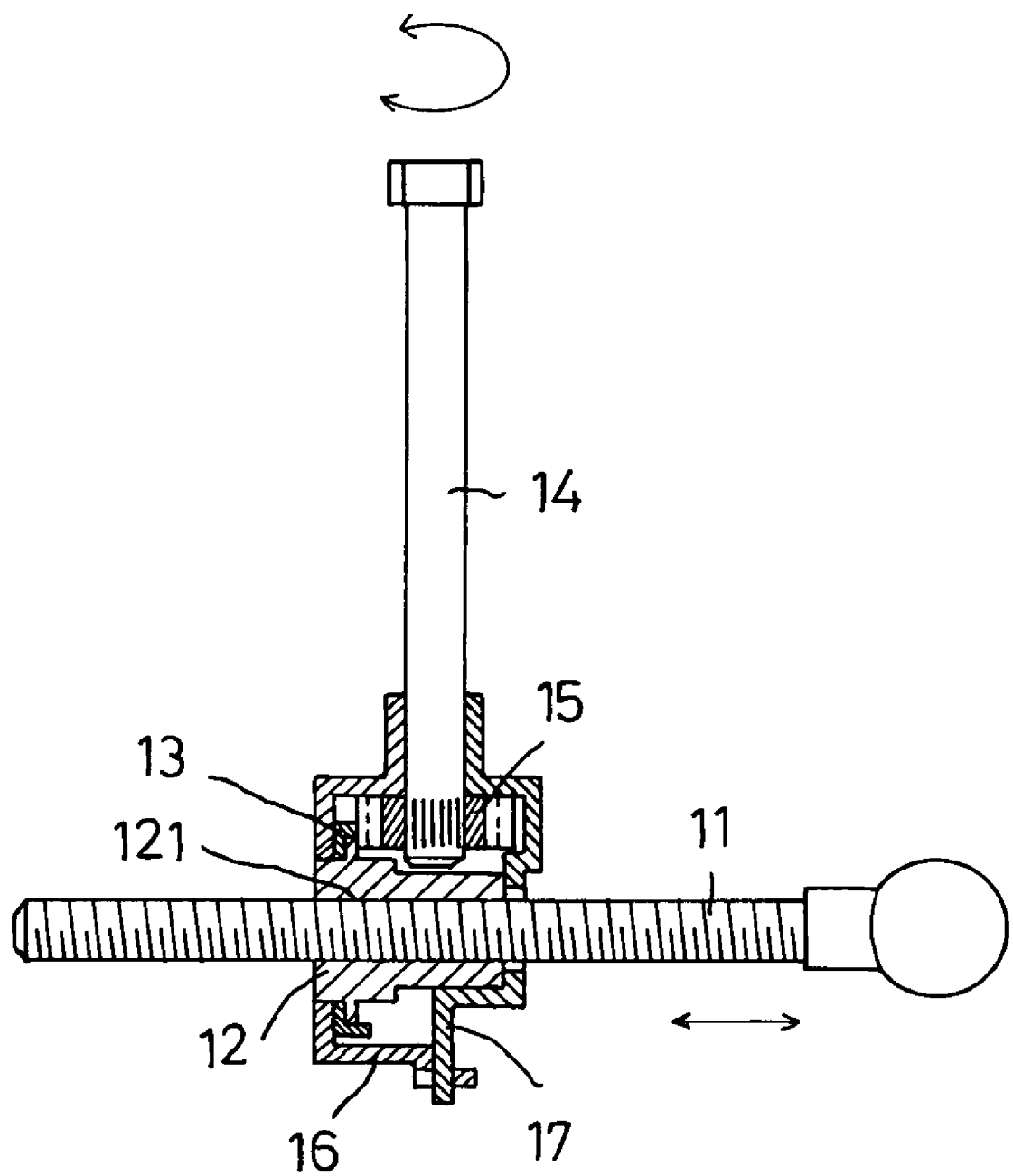
FIG. 2 is a side cross-sectional view of the adjusting device for automobile headlamp projection angle in FIG. 1.
Figure 3:
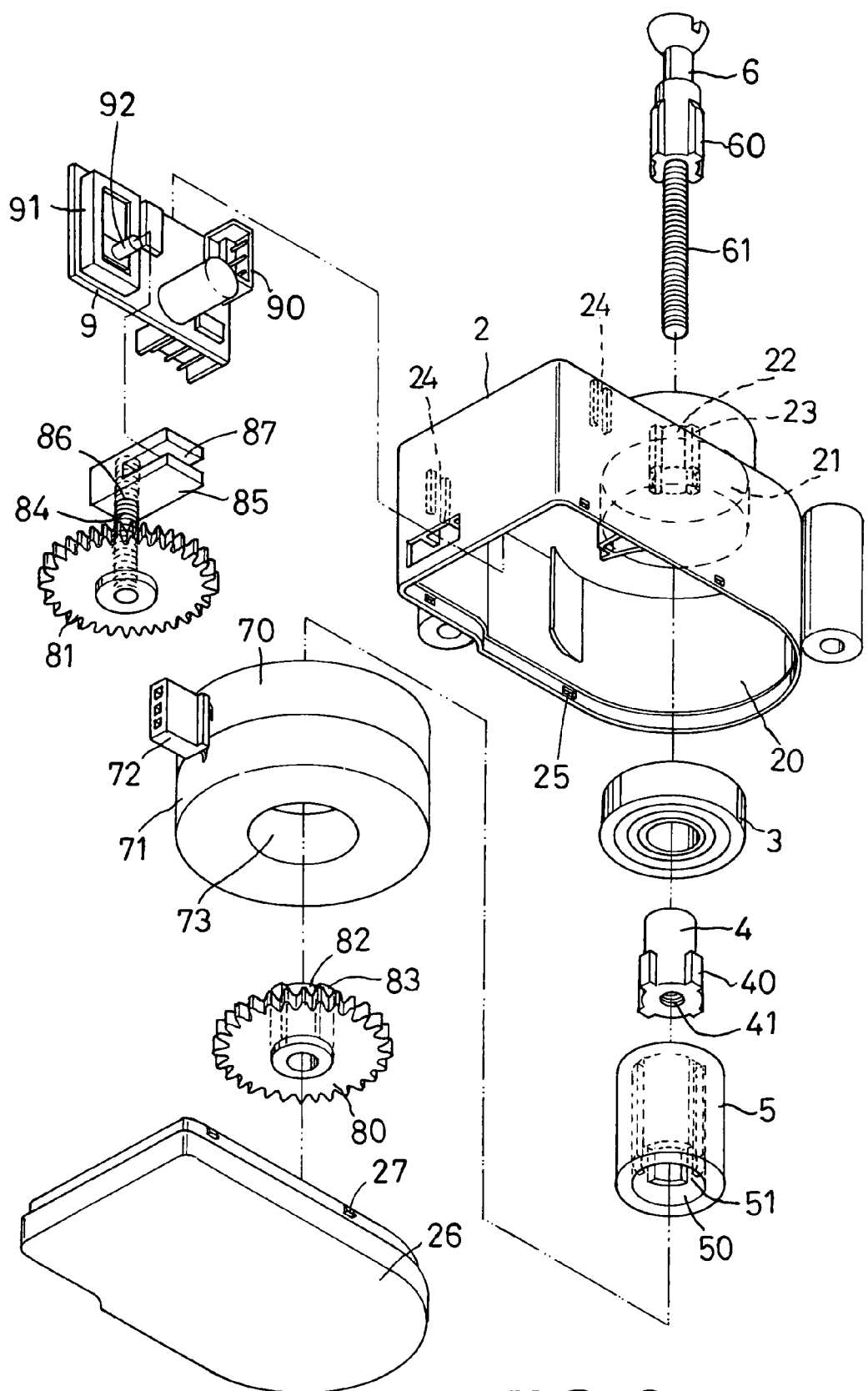
FIG. 3 is an exploded perspective view of an adjusting device for automobile headlamp projection angle of the present invention.
Figure 4:
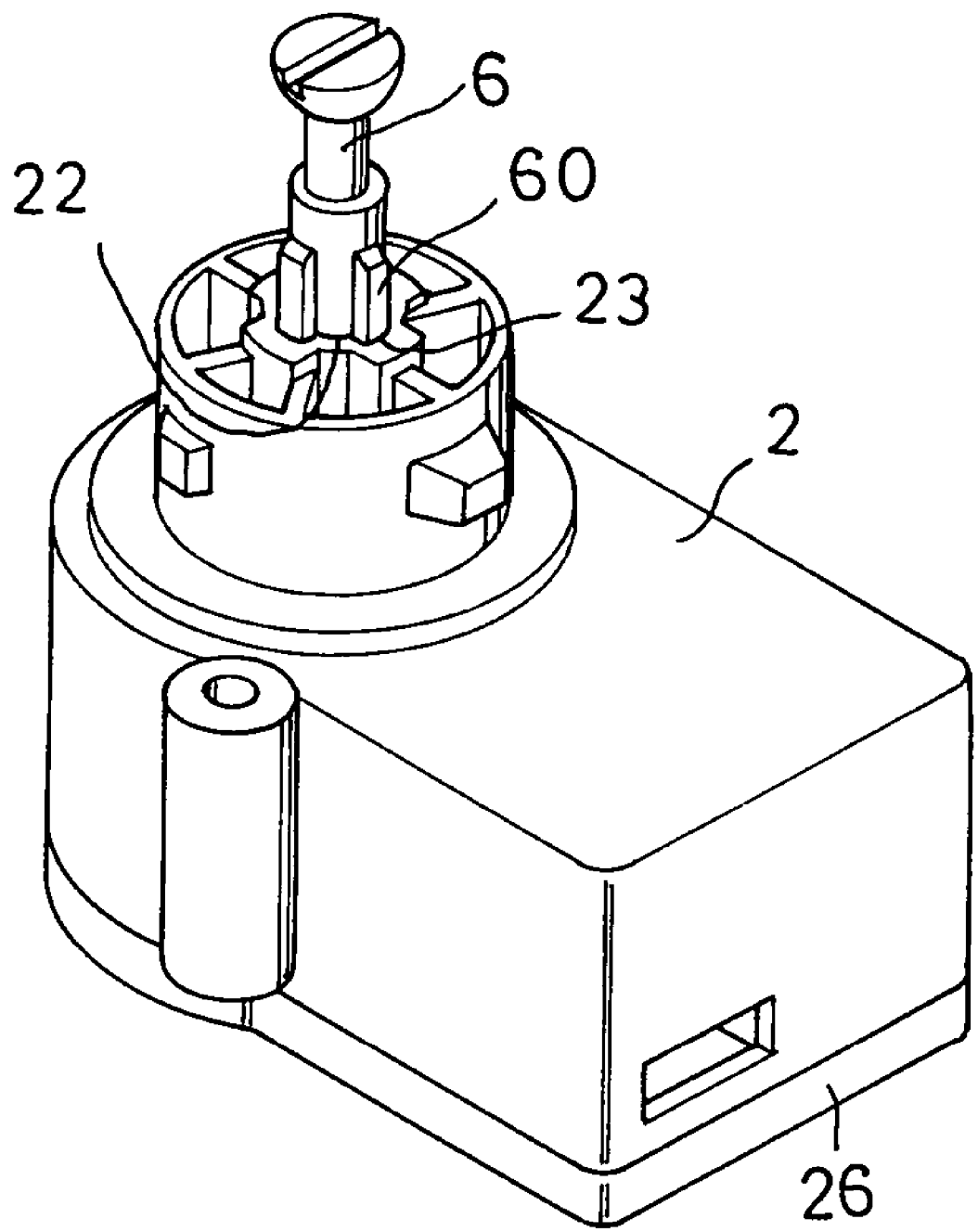
FIG. 4 is a perspective view of the adjusting device for automobile headlamp projection angle in FIG. 3.

Firstly, referring to FIG. 3, an adjusting device for automobile headlamp projection angle according to the present invention comprises a case 2, a bearing ring 3, a connection beam 4, a magnet 5, a main axle 6, a forward-wound coil 70, a backward-wound coil 71, an active transmission gear wheel 80, a passive transmission gear wheel 81 and a circuit board 9.

The inner space of the case 2 defines a receptacle 20, on wall of which is further provided with a substantially round cavity 21. The inner end of the cavity 21 is extended with a though hole 22. The inner wall of the though hole 22 is provided with a plurality of retaining grooves 23. A pair of insertion grooves 24 are installed on two opposite walls of the receptacle 20. Further, the lower rim of the case 2 is provided with a plurality of retaining holes 25, which are capable of being engaged with a corresponding plurality of retaining projections 27 on a lower cover 26.

The bearing ring 3 is disposed in the cavity 21 of the case 2.

The connection beam 4 is mounted right beneath the bearing ring 3, through which one end of the connection beam 4 goes. The outer wall of the connection beam 4 is provided with a plurality of projections 40, and the center of the connection beam 4 is provided with a hole with a screw thread 41.

The other end of the connection beam 4 is inserted into a central through hole 50 of a magnet 5. The inner wall of the through hole 50 is provided with a plurality of retaining grooves 51 for engaging with the projections 40 on the connection beam 4.

The main axle 6 goes through a through hole 22 of the case 2 and embedded within the hole with a screw thread 41 of the connection beam 4. The outer wall of the main axle 6 is provided with a plurality of projections 60. The main axle 6 further includes a primary bolt 61.

The forward-wound coil 70 and the backward-wound coil 71 are placed up and down, having a common axis, in the receptacle 20 of the case 2. Therefore, the common central space defines a central hole 73.

The active transmission gear wheel 80 and the passive transmission gear wheel 81 are also placed in the receptacle 20 of the case 2. The active transmission gear wheel 80 is located under the magnet 5 and provided with a connection piece 82 on the side facing the magnet 5. The outer wall of the connection piece 82 is further provided with a plurality of projections 83 for a lateral engagement with the passive transmission gear wheel 81. The passive transmission gear wheel 81 is further provided with a secondary bolt 84 having a stopping piece 85 attached thereon. One lateral side of the stopping piece 85 is provided with a lateral groove 87.

The circuit board 9, inserted into a slot 24 on an inner wall of the case, has an electric socket 90 and a switch 91 for restricting the position of the secondary bolt 84. The switch 91 further includes a handle 92 for controlling the shift range of the main axle 6.

Referring to FIGS. 3, 4, 5 and 6, the installation of the adjusting device for automobile headlamp projection angle is begun by inserting the upper portion of the connection beam 4 into the bearing unit 3. The upper terminal of the connection beam 4 can be made slightly expanding outwardly, whereby the bearing unit 3 can be mounted stably on the connection beam 4. The magnet 5 is then coupled with the other end of the connection beam 4, in which the projections 40 of the connection beam 4 are engaged with the retaining grooves 51 within the through hole 50 of the magnet 5. Therefore, the connection beam 4 and the magnet 5 are connected, and the combined structure is placed in the receptacle 20 of the case 2, whereby the bearing unit 30 will be housed in the cavity 21 of the case 2. Secondly, the main axle 6 is inserted into the case 2 through the through hole 22, whereby the primary bolt 61 of the main axle 6 will be locked into the hole with a screw thread 41 along the connection beam 4, and whereby the projections 60 of the main axle 6 will be coupled with the retaining grooves 23 of the case 2. The forward-wound coil 70 and the backward-wound coil 71 are placed up and down, having a common axis, in the receptacle 20 of the case 2. Thereby, the forward-wound coil 70 and the backward-wound coil 71 will encircle the magnet 5. The active transmission gear wheel 80 is placed under the magnet 5, with the projections 83 on its connection piece 82 being engaged with the retaining grooves 51 of the magnet 5. Finally, the circuit board 9 is placed in the receptacle 20 of the case 2. The forward-wound coil 70 and the backward-wound coil 71 are then connected with the socket 90 on the circuit board 9. The handle 92 of the switch 9 is then inserted into the lateral groove 87 of the stopping piece 85. The active transmission gear wheel 80 and the passive transmission gear wheel 81 will be coupled. The retaining projections 27 on a lower cover 26 will then be engaged with the retaining holes 25 of the case 2, so as to form a closed box. This completes the process of installation for the adjusting device for automobile headlamp projection angle.

Figure 5:
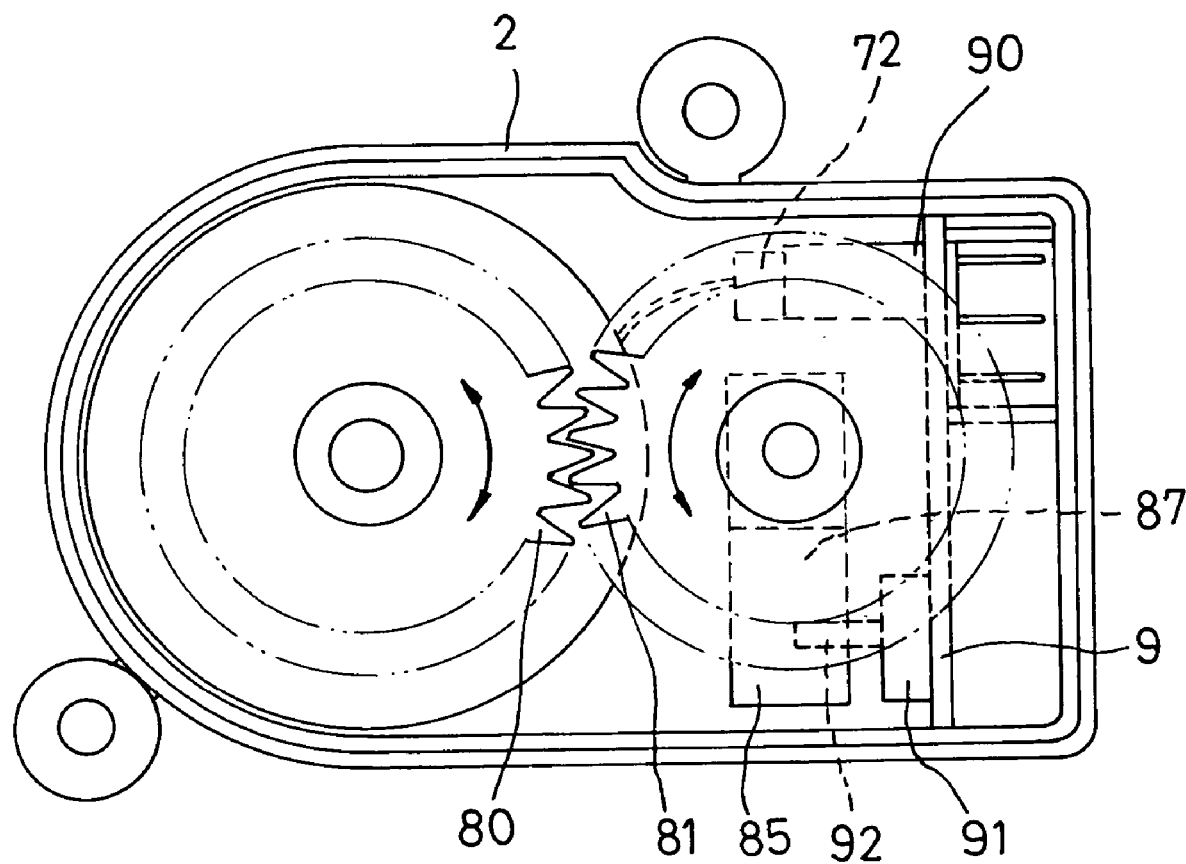
FIG. 5 is a top view of the adjusting device for automobile headlamp projection angle in FIG. 3.
Figure 6:
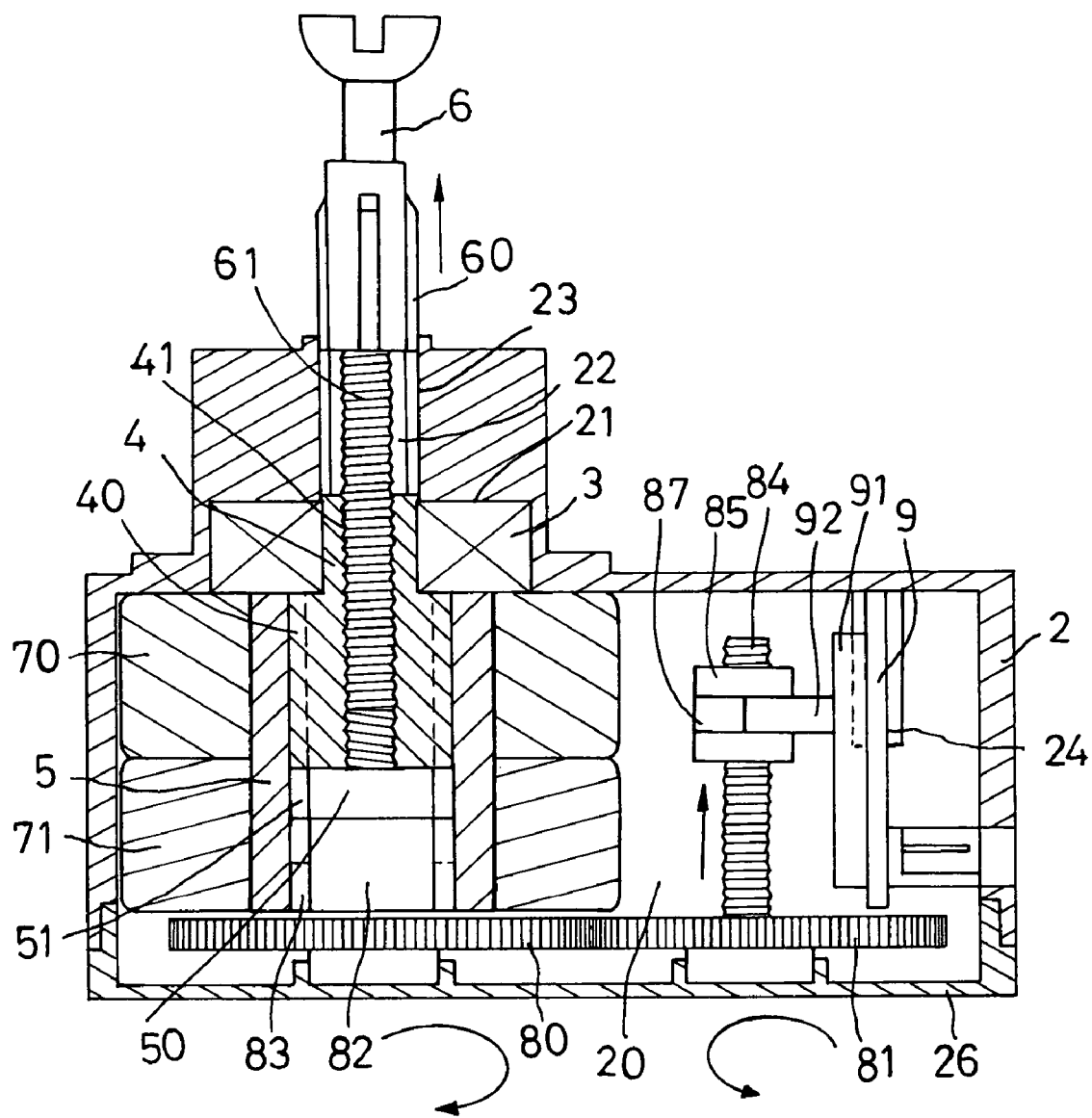
FIG. 6 illustrates that a main axle is being ascended to the top of a case.
Figure 7:
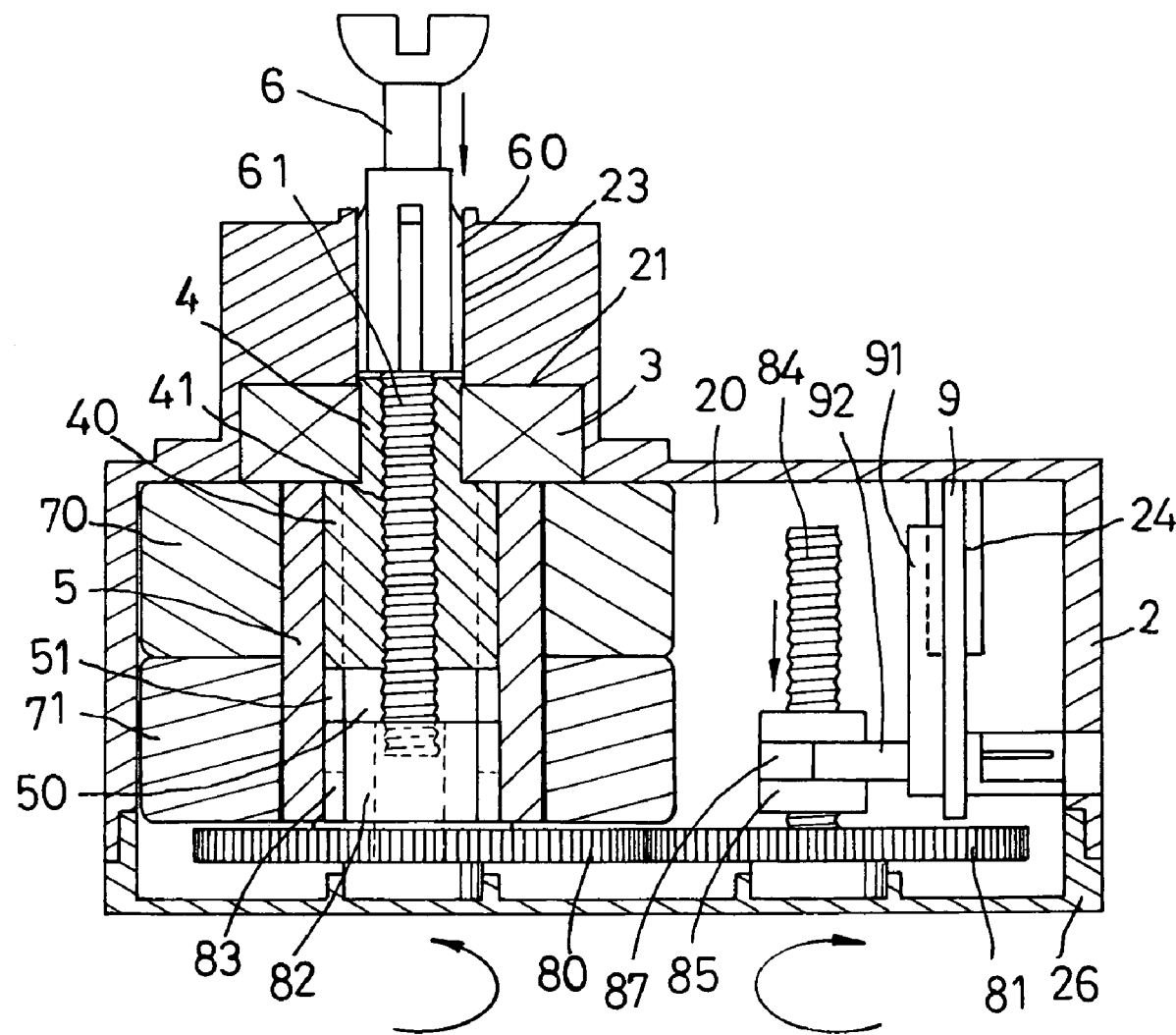
FIG. 7 illustrates that the main axle is being descended on the bottom of the case.

Referring to FIGS. 5 to 7, the use of the device is begun with charging the forward-wound coil 70 by the circuit board 9 and bringing the magnet 5 to a polarity that makes the connection beam 4 and the active transmission gear wheel 80 rotate clockwise. The main axle 6 connected to the connection beam 4 is restricted by the retaining grooves 23 of the case 2 and fixed, resulting in a relative motion between the primary blot 61 and the hole with a thread 41. Thereby, the main axle 6 will move upward, and the headlamp connected to the main axle 6 will change its projection angle. At the same time when the active transmission gear wheel 80 is driven by the magnet 5, the passive transmission gear wheel 81 will be driven to rotate, and the secondary bolt 84 thereon will carry the stopping piece 85 upward accordingly. And the stopping piece 85 will bring the handle 92 of the position-restricting switch 9 toward the upper limit till the switch cuts down the electricity for the coil and therefore the magnet 5 stops the driving. As shown in FIG. 7, when we want to adjust the projection angle of the headlamp in the opposite direction, the circuit board 9 will charge the backward-wound coil 71 and bring the magnet 5 to a polarity that makes the connection beam 4 and the active transmission gear wheel 80 rotate counter-clockwise, resulting in a relative motion between the primary blot 61 and the hole with a thread 41. Thereby, the main axle 6 will move downward, and the head lamp connected to the main axle 6 will change its projection angle. At the same time when the active transmission gear wheel 80 is driven by the magnet 5, the passive transmission gear wheel 81 will be driven to rotate, and the secondary bolt 84 thereon will carry the stopping piece 85 downward accordingly. And the stopping piece 85 will bring the handle 92 of the position-restricting switch 9 toward the lower limit till the switch cuts down the electricity for the coil and therefore the magnet 5 stops the driving.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An adjusting device for automobile headlamp projection angle, comprising:

an open case provided with a receptacle and a cavity, said cavity being further provided with a though hole, an inner wall of said though hole being provided with a plurality of retaining grooves, said case further including a lower cover, whereby the engagement of said case with said lower cover will form a closed box;

a bearing ring disposed in said cavity of said case;

a connection beam mounted beneath said bearing ring, one terminal of said connection beam going through said bearing ring, an outer wall of said connection beam being provided with a plurality of projections, said connection beam further including a hole with a screw thread;

a magnet bushing a second terminal of said connection beam through a central through hole thereof, an inner wall of said through hole being provided with a plurality of retaining grooves for engaging with said projections on said connection beam;

a main axle going through said through hole of said case and being embedded within said hole with a screw thread of said connection beam, an outer wall of said main axle being provided with a plurality of projections, said main axle further including a primary bolt;

a pair of forward-wound coil and backward-wound coil placed up and down, having a common axis, in said receptacle of said case, the common central space defined by the combined structure of said forward-wound coil and said backward-wound coil forming a central hole;

a pair of active transmission gear wheel and passive transmission gear wheel placed in said receptacle of said case, said active transmission gear wheel being located under said magnet and provided with a connection piece on a side thereof facing said magnet, an outer wall of said connection piece being further provided with a plurality of projections for a lateral engagement with said passive transmission gear wheel, said passive transmission gear wheel being further provided with a secondary bolt with a stopping piece attached thereon, one lateral side of said stopping piece being provided with a lateral groove; and a circuit board inserted into a slot on an inner wall of said case, said circuit board having an electric socket and a switch for restricting the position of said secondary bolt, said switch further including a handle for controlling the shift range of said main axle.

2. The adjusting device for automobile headlamp projection angle of claim 1 wherein said case further includes a plurality of retaining holes around the rim of said lower opening, and said lower cover further includes a plurality of corresponding projections; thereby said case being able to engage said lower cover to form a closed box.

3. The adjusting device for automobile headlamp projection angle of claim 1 wherein said case further includes another slot for the insertion of said circuit board.

* * * * *